Sept. 21, 1965  R. W. MILLER  3,207,242
EARTH AUGER WITH INTEGRAL MOUNTING FOR CUTTING MEMBERS
Filed Oct. 11, 1963  2 Sheets-Sheet 1
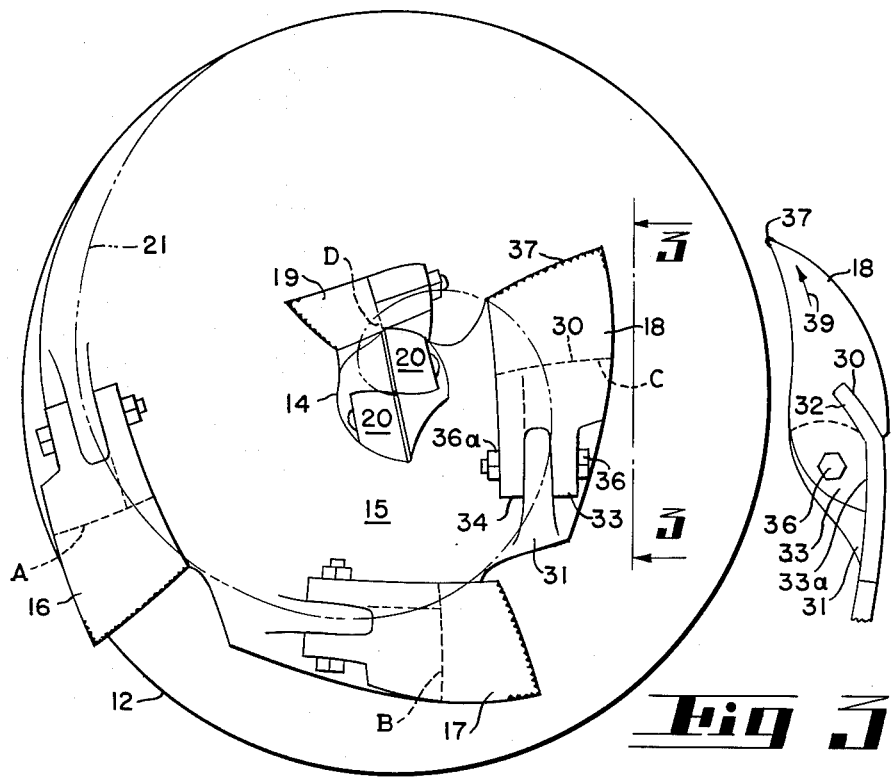
Fig 3
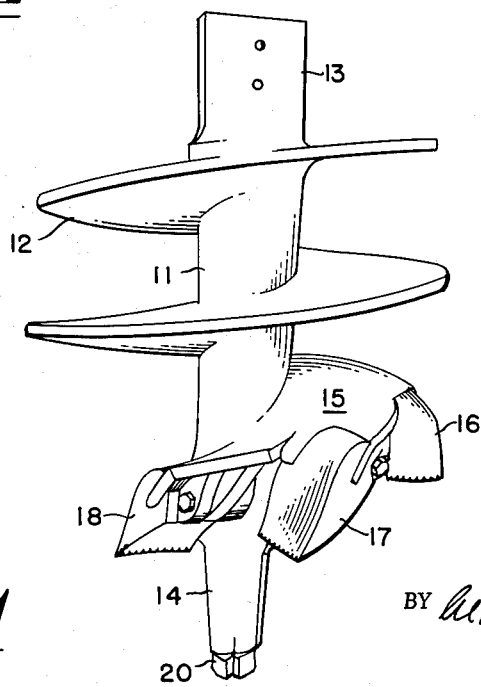
Fig 2
Fig 1
INVENTOR.
ROBERT W. MILLER
BY
ATTORNEY.

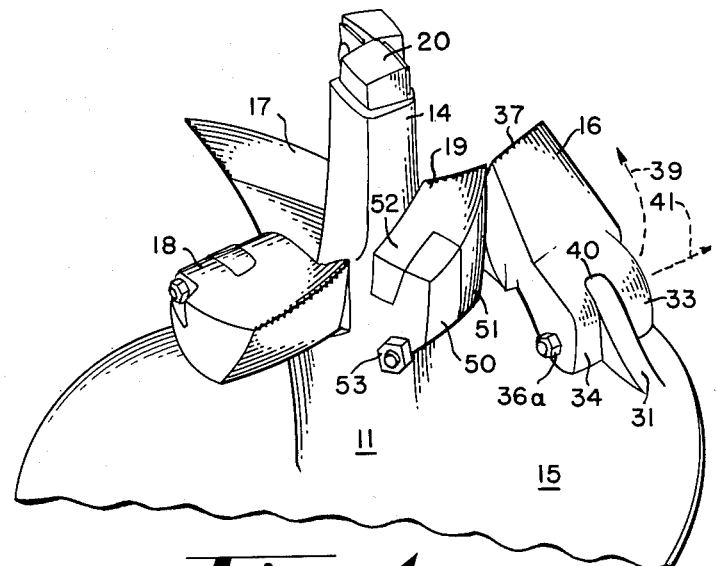
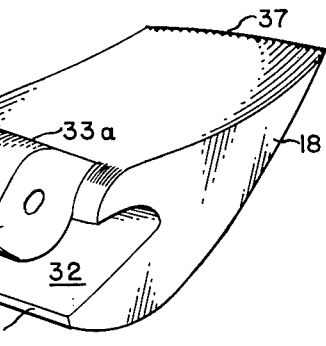
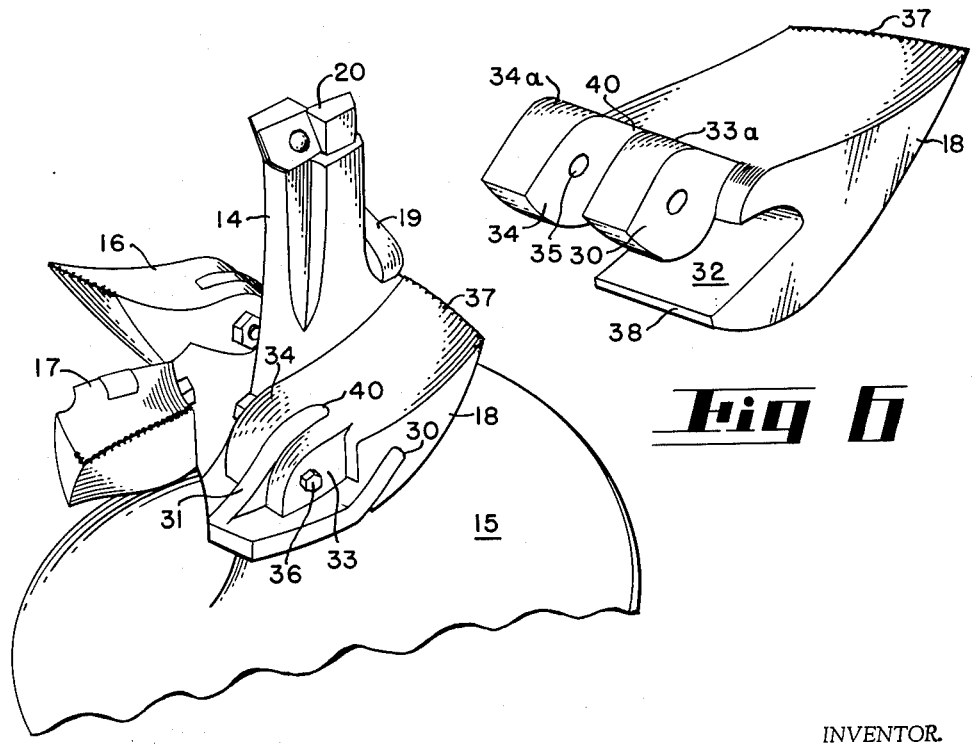

United States Patent Office 3,207,242
Patented Sept. 21, 1965

3,207,242
EARTH AUGER WITH INTEGRAL MOUNTING
FOR CUTTING MEMBERS
Robert William Miller, Cincinnati, Ohio, assignor to
Alaskaug, Inc., Cincinnati, Ohio, a corporation of
Ohio
Filed Oct. 11, 1963, Ser. No. 315,566
7 Claims. (Cl. 175—394)

This invention relates to earth augers and has for its principal object the provision of an auger with readily attachable and detachable cutting members, and mountings therefor, that are extremely rugged in construction and capable of withstanding the extreme forces generated when drilling into compacted earth, hardpan or hard rock or concrete rubble, without the cutting members becoming dislodged from the auger flight upon which they are supported.

Earth augers are well known in the art and are normally designed for the heavy duty requirements inherent in this activity. Typically, an earth auger is constructed of cast alloy steel and is designed to bore circular holes of varying diameter often as large as 24″ or larger. Although augers of this type are usually rotated at relatively low speeds, for instance 20 to 30 r.p.m., they are subjected to down pressures or loads of the order of 20,000 to 30,000 pounds and during this rotation many thousands of foot pounds of torque are applied. The enormous stresses thus imposed on the cutting members tend to loosen them and cause them to break away from the auger flight to which they are secured.

The present invention provides a supporting means or mounting for cutting members, in which the members are secured to the auger flight by simply inserting them and locking them in place by a single securing means which is not itself subject to shearing forces generated during the drilling operation. Dislodgement or loss of the cutting members is rendered impossible without fracture of the mounting itself, which is extremely unlikely to occur since it is integrally cast with the auger and is constituted of extremely hard and tough alloy steel of the same cross section as the auger flight to which it is applied.

Briefly described, the invention comprises an earth boring auger consisting of a unitary member having an integral spiral flight, steps on said flight, said steps having down-turned leading edges defining integral lips, downwardly extending lugs rearwardly of said lips, and cutting members interfitted between said lips and lugs. More specifically, the invention comprises the provision of a simple securing means, for example, a single bolt, not itself subject to shearing forces imposed on the cutting members, by which each of the cutting members is solidly secured between the lips and the lugs.

Objects and advantages of the invention will more clearly appear when reference is had to the accompanying drawings, in which:

FIGURE 1 is an elevational view of an illustrative embodiment of an auger embodying the principles of invention;

FIGURE 2 is a plan view of the bottom of the auger looking upwardly along the axis thereof;

FIGURE 3 is a side elevation taken along the line 3—3 of FIGURE 2;

FIGURE 4 is a fragmentary perspective view of the end of the bottom or working end of the auger which in this view is turned upside down so the view may be taken from above;

FIGURE 5 is a view similar to FIGURE 4 taken with the auger rotated through an angle of approximately 90 degrees; and FIGURE 6 is a perspective view of one of the cutting members that can be secured to the auger in accordance with the principles of the invention.

The illustrative auger is designed principally for use in rock or concrete rubble and may comprise an integral alloy steel casting comprising a stem 11, an auger flight 12, a squared end 13 for mounting into the chuck of an appropriate drill, and an end stem 14 at the tip. Fight 12 is reduced in diameter at 15 from the outermost periphery to the end stem along a spiral line 21, best shown in FIGURE 2. Steps A, B, C and D are provided along this line, on which are mounted cutting members 16, 17, 18 and 19, the latter being located adjacent the stem 14. In the tip are mounted carbide cutting bits 20, which serve to break up and cut away the rock being bored into at the beginning of the drilling operation. Cutting bits 20 are of more or less conventional design and do not of themselves form a part of the present invention.

The cutting members 16, 17 and 18 are in general of the same construction and for simplicity only cutting member 18 and its mounting will be described. This member is shown in perspective in FIGURE 6 and is mounted on step C in the manner hereinafter described. The step C is provided with a down-turned lip 30 and immediately to the rear thereof, a downwardly extending integrally formed lug 31. Cutting member 18 is provided with a slot 32 into which the downturned lip 30 may be inserted, and rearwardly extending bifurcations or ears 33 and 34, integrally formed with the material constituting one side of the slot. These ears provide a space 40 therebetween (see FIGURE 6) which is occupied by the lug 31 when the member is placed in position. The ears 33 and 34 are provided with lateral openings 35 and the lug 31 has a similar opening aligned with the openings in the ears so that a securing member such as bolt 36 may be inserted therethrough, the end of the bolt being provided with a nut 36a.

It will be observed from the foregoing that slot 32 of each cutting member may simply be fitted over the downturned integral lip 30 of the step and while the rearwardly extending ears are slid past the lug 31 until the openings 35 are in alignment with the opening in the lug 31, at which time bolt 36 is secured into place. The leading edge of the step now abuts the end of slot 32, the upper edges 32a and 34a abut the bottom face of the flight, the inner edges of ears 33 and 34 abut the sides of lug 31 and the terminal edge 38 positions itself in substantial alignment with the top face of the flight. Thus a plurality of mating surfaces are provided between the cutting member and its support or mounting. It will also be observed that the minimum cross-section of cutting member 18 (as is true of all the cutting members except the opening bits 20) is at least as great as the minimum cross-section of the flight 15 and the lug 31. Consequently, when the slot 32 of the cutting member is inserted over the downturned lip 30 at the step of the auger, the ears 33 and 34 inserted over the lug 31, and the assembly locked in place by a bolt 36, the cutting member is held against movement in any plane, with all adjacent surfaces in abutment and the bolt protected from shearing forces. Moreover, the major supporting strength of the mounting is thus in alignment with the direction of movement of the cutting member (as shown by arrow 39 in FIGURE 3) as it is rotated during use.

The cutting edge 37, which may simply consist of a strip of welded metal such as a bead of welding rod consisting of a carbon steel alloy of magnesium, molybdenum and silicon, is in advance of the two major supporting areas of the auger flight, namely, downturned lip 30 and the lug 31, and in approxiamtely alignment therewith. By this construction, the cutting members are not only immovably secured to the flight but the supports are aligned with the forces tending to drive the cutting members. This provides maximum strength and since the cross-section of the supports is at least as great as the maximum cross-section of the auger flight, the strength of the cutting bit mounting equals that of the strength of the auger flight itself.

It will be apparent that conventional cutting bits of tungsten carbide or the like may be secured to cutting members 16, 17 and 18 in lieu of providing a hard edge 37 as above described. The provision of such bits and their mounting, directly or indirectly on the auger flight, are well known in the art.

The innermost cutting member 19 is of somewhat different construction except the same principles of maximum strength and force alignment are applied. Cutting member 19 consists of an upwardly extending (downwardly extending in FIGURE 4) leg 51 and a rearwardly extending leg 52, the two legs embracing a lug 50 integrally cast in the stem 11–14. An aperture is drilled through leg 51 and lug 50 along a line parallel to a tangent to the stem, through which a bolt 53 is secured. Since the inner face of cutting member 19 abuts the stem 14, a construction is thus provided which is even stronger and more rugged than the supports for members 16, 17 and 18.

It will be appreciated that the cutting members 16 and 17 are secured to steps A and B similarly to the way in which cutting member 18 is secured ot step C, except of course that these steps are located progressively further away from the center or axis of the stem along the spiral line 21.

Having thus described my invention, I claim:

1. An earth boring auger comprising an integral spiral flight, steps on the periphery of said flight, said steps having downturned leading edges defining integral lips, a downturned lug rearwardly of each of said lips and cutting members having cooperative surfaces interfitted between said lips and lugs, each of said cutting members being secured by a single bolt extending therethrough and through said lug.

2. An earth boring auger comprising an integral spiral flight, steps on the outer periphery of said flight, said steps having downturned leading edges defining integral lips, a downturned lug rearwardly of each of said lips, a plurality of cutting members each having a forward cutting edge and rearward slots into which a lip and lug are received, and means for securing said cutting members to said lugs.

3. An earth boring auger comprising an integral spiral flight, steps on the outer periphery of said flight, said steps having downturned leading edges defining integral lips, a downturned lug rearwardly of each of said lips, a plurality of cutting members each having a forward cutting edge and rearward slots into which a lip and lug are received, and means for removably securing said cutting members to said lugs.

4. An earth boring auger comprising an integral spiral flight, steps on the outer periphery of said flight, said steps having downturned leading edges defining integral lips, a downturned lug rearwardly of each of said lips, a plurality of cutting members each having a forward cutting edge and rearward slots into which a lip and lug are received, and means for securing said cutting members to said lugs, the forward cutting edge of each cutting member being disposed substantially radially of the auger and having a radial dimension equal to the radial dimension of its corresponding step.

5. An earth boring tool comprising an auger flight, the end portion of said flight decreasing in diameter spirally toward its terminus, steps on the periphery thereof, downturned lips on said steps, a downwardly extending lug rearwardly of each of said lips, cutting members having rearward lots into which said lips and lugs are received, and means for securing said cutting members therebetween, with adjacent surfaces of said members in abutment with said flight in a plurality of different planes.

6. An earth boring auger comprising an integral flight, steps on the periphery thereof, said steps having downturned leading edges defining integral lips, a downwardly extending lug rearwardly of each of said lips, and cutting members having rearwardly extending slots receiving said lips and lugs, said slots providing cooperating surfaces with corresponding portions of said flight and means for securing the said cutting members to said flight when said lips and lugs are received in said slots.

7. An earth boring tool comprising an auger having an integrally formed flight, indentations in the periphery thereof defining steps, said steps being positioned on a spiral line extending from the outermost diameter of said flight to the terminus thereof, cutting members secured adjacent the terminus, integral lips extending downwardly from said steps, an integral lug extending downwardly from said flight rearwardly of each of said steps, rearwardly slotted cutting members interfitted between said lugs and lips and means for securing the same in interfitted position.

References Cited by the Examiner

UNITED STATES PATENTS

| | | | |
|---|---|---|---|
| 2,680,597 | 6/54 | Brown | 175—413 X |
| 2,709,573 | 5/55 | Reed | 175—394 X |
| 2,731,237 | 1/56 | Henning | 175—391 |
| 2,838,285 | 6/58 | Gredell | 175—413 X |
| 3,024,856 | 3/62 | Henning | 175—394 X |

CHARLES E. O'CONNELL, *Primary Examiner.*

BENJAMIN BENDETT, *Examiner.*